(12) United States Patent
Veeraraghavan

(10) Patent No.: US 7,012,992 B2
(45) Date of Patent: Mar. 14, 2006

(54) METHODS AND APPARATUS FOR AUTOMATING TESTING OF SIGNALLING TRANSFER POINTS

(75) Inventor: Malathi Veeraraghavan, Charlottesville, VA (US)

(73) Assignee: Verizon Services Corp., Arlington, VA (US)

( * ) Notice: Subject to any disclaimer, the term of this patent is extended or adjusted under 35 U.S.C. 154(b) by 335 days.

(21) Appl. No.: 10/628,080

(22) Filed: Jul. 25, 2003

(65) Prior Publication Data

US 2005/0147211 A1    Jul. 7, 2005

Related U.S. Application Data

(60) Provisional application No. 60/466,572, filed on Apr. 30, 2003.

(51) Int. Cl.
*H04M 1/24* (2006.01)

(52) U.S. Cl. .............. 379/10.01; 379/15.02; 379/15.04; 379/32.01

(58) Field of Classification Search ........... 379/1.01, 379/32.01, 32.02, 32.03, 9, 10.01, 10.02, 379/12, 15.01, 15.02, 15.03, 15.04, 18, 22.03; 370/241, 244, 245, 243, 247, 248; 455/423, 455/424, 425; 709/223, 224, 225; 710/25, 710/26, 27

See application file for complete search history.

(56) References Cited

U.S. PATENT DOCUMENTS 6,052,406 A * 4/2000 Epstein et al. ............. 375/134
6,157,967 A * 12/2000 Horst et al. ................. 710/19
6,748,451 B1 * 6/2004 Woods et al. .............. 709/248
2003/0043753 A1 * 3/2003 Nelson et al. ............. 370/249
2003/0235216 A1 * 12/2003 Gustin ....................... 370/509
2004/0062278 A1 * 4/2004 Hadzic et al. ............. 370/503

OTHER PUBLICATIONS

Tim Moors, Malathi Veeraraghavan, Zhifeng Tao, Xuan Zheng, Ramesh Badri, "Experience in automating the testing of SS7 Signaling Transfer Points" published in ACM SIGSOFT Software Engineering Notes, vol. 27, ISSUE 4 (Jul. 2002) pp. 154-158.

* cited by examiner

*Primary Examiner*—Rexford Barnie
(74) *Attorney, Agent, or Firm*—Leonard C. Suchyta, Esq.; Joel Wall, Esq.; Straub & Pokotylo

(57) ABSTRACT

Methods and apparatus for automating network testing to determine device interoperability and standards compliance in a network setting are described. The invention provides for maintaining clock error information for multiple network clocks and for adjusting test results obtained from taking measurements at different network locations using time information obtained from different clocks. After correction of detected event, e.g., result, time stamps, the detected events are compared to a list of expected events. The results of the comparison are categorized and processed to form a report. The report includes undetected events as well as detected events which were not expected. To simplify the report, the first undetected expected event in each chain of expected events is listed in the report with related undetected expected events in the same chain of expected events being omitted from the report.

21 Claims, 5 Drawing Sheets

METHODS AND APPARATUS FOR AUTOMATING TESTING OF SIGNALLING TRANSFER POINTS

This application claims the benefit of U.S. Provisional Patent Application No. 60/466,572 filed Apr. 30, 2003 which has the same title as the present application and which is hereby expressly incorporated by reference.

FIELD OF THE INVENTION

The present invention is directed to communications systems and, more particularly, to methods and apparatus for automatically testing, analyzing and/or evaluating network communication devices for interoperability and/or communications standards compliance.

BACKGROUND OF THE INVENTION

Communications systems often involve multiple elements networked together. The network elements, e.g., switches, routers, and signal transfer points, are often required to operate in a manner that complies with one or more standards, e.g., communications protocol standards, which may ser signal timing, fault handling, and message requirements. As networks and communications protocols become more advanced, compliance and interoperability testing becomes more difficult. Realistic testing of network components to determine interoperability and standards compliance in situations approaching actual network circumstances has proven to be a difficult task because of the complexity of the chain of events which must be tested for and problems associated with obtaining accurate event timing information. Some of the difficulties associated with testing are a function of differences, e.g., inaccuracies, in the clocks associated with various network components which monitor for events and provide time stamps corresponding to the time of the detected events. In accuracies in network component clocks make it difficult to accurately compare and sequence events detected at different points in a network to determine if they occurred in the proper order and within specified times of one another.

IP based networks as well as other communications networks often share the above described interoperability and standards compliance testing problems. A well known network in which such testing problems are frequency encountered is the Public Switched Telephone Network (PSTN). Telephone service providers worldwide use signaling protocols, e.g., Signalling System 7 (SS7) protocol to provice the signaling required for communication systems, e.g., SS7, may exist between Service Switching Points (SSPs), Service Control Points, (SCPs), and Signalling Transfer Points (STPs) in a communications network. The SSPs are end sources and destinations for the SS7 messages. The SCPs provide database functions. The STPs switch the SS7 messages on their paths as they travel throughout the system.

Typically, STPs are deployed in mated pairs, providing redundancy, and enabling the switching service to be maintained even if one STP should fail. Mated pairs of STPs may be interconnected throughout the SS7 network. A mated pair of STPs may connect to a set of STPs, to SCPs, that provide database functions, or to another mated pair of STPs. One commonly used STP interconnection setup is called a QUAD configuration consisting of 2 sets of mated pairs. The total SS7 communications network may be operated by a single organization or may be a composite of smaller SS7 networks operated by different organizations. Interfaces between SS7 networks allow a Local Exchange Carrier to send its signaling traffic over another carrier's network. This is becoming increasingly important in the United States as regulatory bodies are encouraging competition between Local Exchange Carriers by requiring incumbent carriers to open their network to the signaling traffic of competitors, in exchange for being granted rights to provide long-distance services. Different carriers may source their STPs from different vendors or configure their STPs differently; this leads to a need to test the interoperability of STPs from different carriers. A single carrier may source STPs from different vendors, for reasons such as risk management or encouraging competition between vendors for the supply equipment. Typically, a single carrier will often deal with three or more different vendors of STPs. Each STP vendor regularly issues new releases of the software and hardware for their STPs, e.g., multiple times per year. Thus, a communications system may include a composite of STPs from many vendors, with multiple hardware and software versions. For a carrier to ensure that the signaling network continues to operate correctly, it needs to regularly test STP quad interoperability. Thus carriers have a strong need for performing interoperability and conformance testing of STPs on a regular basis to ensure that the reliability of their system is maintained.

The testing to be performed on STPs is complicated due to the nature of the SS7 protocol, time consuming, labor intensive, and (for the most part) mundane. The labor intensive nature of the analysis of the testing as currently performed results in significant cost for the communications provider. The characteristics described above make STP Quad interoperability testing a good candidate for automation. In view of the above discussion, it is clear that a need exists in the industry for a better system and method to perform STP testing, e.g., interpretability testing. Preferably, one or more testing steps should be automated thereby reducing the time required to perform the testing and increasing test accuracy.

SUMMARY OF THE INVENTION

Automated methods for testing communications network components, one or more of which operate on different time clocks, in realistic network settings are described. In accordance with the present invention, information about network clock inaccuracies is maintained and stored in a file. A file listing test stimulus and expected events resulting from the test stimulus is also stored along with information about the time the expected events are to occur, relative to the event which acts as a stimulus causing the excepted event to occur.

A routine is used to convert the file of expected events with relative times to a set of expected events by calculating the actual expected event times based on one or more stimulus start times which correspond to the time an expected test stimulus is to be applied to the system under test. The system is monitored following application of the stimulus. Monitoring of different network points may be performed by one or more network elements. The time of a detected event is stored along with information indicating the detected event. The time may be provided by a network component local to the detected event or by one or more devices performing the monitoring. A file of the detected events, event time information, and information indicating the network component clock used to provide the time information is stored for further processing.

The timing information included in the file of detected events is subject to one or more correction operations. The time associated with individual events is corrected based on known clock error information relating to the network clock which provided the time associated with the detected event. Such network clock error information may be generated, e.g., on a periodic basis or prior to a test, by obtaining time information from the network clocks supplying time information for a test and comparing each clock to a single value, e.g., known time, to generate a correction value for each of the network clocks being used. Correction of the times associated with detected events allows for accurate time comparisons and synchronization of the detected events listed in the detected event file. Events may be reordered in the detected event file to indicate actual order of occurrence following the time correction step.

Following timing correction, the detected events and corresponding event times are compared to the expected events and expected event times. Detected events are categorized. Missing events are identified and unexpected events, e.g., events not in the expected event list are also identified. These events may be highlighted or otherwise flagged to bring attention to these events.

A report of test results is generated from the results of comparing the time corrected detected event list to the expected event list. Events which were expected but were not detected and events which were detected but not expected are categorized and/or highlighted in the report. Expected events which were detected may also be indicated and listed in the report of test results. To simplify report presentation and bring a tester's attention to problems which may result in the failure for multiple events to occur and be detected, in some embodiments, events which should have occurred due to an undetected event are omitted from the list of undetected events with the root undetected event being the one that is listed in the report of undetected expected events.

In the above described manner, automated testing is made possible in a complex network setting despite clock inaccuracies in network components. Furthermore, testing of extremely large numbers of events and device interactions can be performed in an automated manner in a realistic network setting which might be impossible if the testing and resulting detected events had to be performed and analyzed by a human operator without the assistance of the automation provided by the present invention.

Numerous additional features and embodiments of the present invention are discussed in the detailed description which follows.

DETAILED DESCRIPTION

As discussed above, the present invention is directed to methods and apparatus for automatically testing, analyzing and evaluating communications network components, e.g., Signaling Transfer Points (STPs), for interoperability and/or standards compliance.

Figure 1:
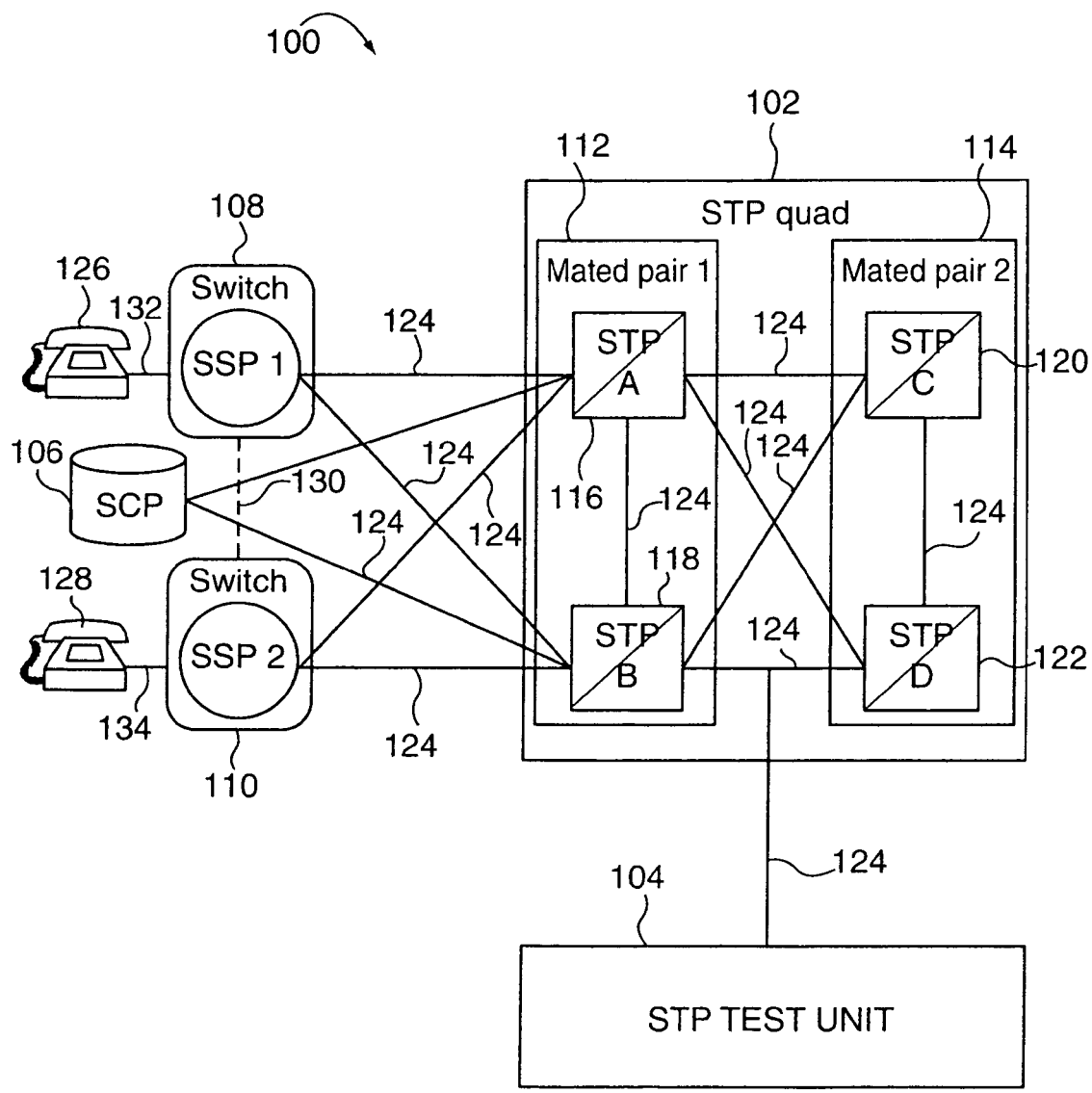
FIG. 1 illustrates a communications system including the testing apparatus of the present invention.

FIG. 1 illustrates a communications system 100 implemented in accordance with an exemplary embodiment of the present invention. The system uses the SS7 protocol. Accordingly, testing may be for purposes of determining SS7 compliance and/or device interoperability, e.g., while implementing the SS7 protocol.

The system 100 includes an STP Quad 102, an STP Test Unit 104, a Service Control Point (SCP) 106, a plurality of Signal Switching Points (SSPs) including SSP1 108 and SSP2 110. The system also includes telephones 126. The term STP Quad is used to refer to a configuration of four interconnected STPS 116, 118, 120, 122. Each STP has an internal system clock which provides event time information for events detected at the particular STP. STP Quad 102 includes 2 sets of mated pair STPs 112, 114. STP mated pair 1112 includes STP A 116 and STP B 118. STP mated pair 2 114 includes STP C 120 and STP D 122. Individual SS7 Signalling links 124 couple each STP 116,118,120,122 within STP Quad 102 to each other STP in Quad 102. In addition, another SS7 link 124 couples the STP Quad 102 to the STP Test Unit 104. Additional SS7 links 124 couple each STP 116,118 within STP mated pair 1 112 to the SCP 106 and to each SSP 108,110.

SSP1 108 is coupled to SSP2 110 via voice trunk 130 and is also coupled to telephone 126 via voice link 132. SSP2 is coupled to telephone 128 via voice link 134. Voice signals are generated and received at telephones 126,128. The voice signals travel between telephones 126,128 through SSPs 108,110, where the appropriate switching connections are performed to establish the voice connection, via voice links 132,134 and voice trunk 130. The voice links 132,134 may be, for example, twisted pair wires, and the voice trunk 130 may be, for example, a fiber optic cable.

The signaling protocol, Signaling System 7 (SS7), in the example of FIG. 1, provides the signaling message structure required for the telephone communications between telephones 126, 128. The STPs 116,118,120,122 are core components of the SS7 network. The SSPs 108, 110 generate SS7 messages and act as their ultimate destinations. The STPs 116,118,120,122 switch these SS7 messages on their path along SS7 links 124 from origin to destination. Each STP mated pair 112, 114 by including 2 STPs (116,118), (120,122) provides redundancy so that switching service may be maintained even if one STP fails. The SCP 106, connected in the SS7 network via SS7 links 124, provides database functions utilized for communications, signaling, and other services provided.

The STP Quad 102 may include pairs of STPs 112, 114 belonging to an SS7 network operated by a single organization, or may form the interface between SS7 networks from different organizations. For example, STP pair 112 may belong to one organization, and STP pair 114 may belong to a competitor organization. Interfaces between SS7 networks, such as with the Quad configuration, allow a local exchange carrier to send its signaling traffic over another carrier's network. Each STP may be sourced from a different vendor, may be a different model or revision from the same vendor, may have a different version or release of STP software or hardware, and/or may be configured differently. The location of each component of the system 116, 118, 120, 122, 106, 108, 110, 126, 128, 104 may vary; therefore, the type and length of SS7 links 124, voice links 132, 134, and voice trunks 130 may also vary. Each SSP 116, 118, 120, 122 may include its own system clock which, due to clock errors, may indicate a different time than the time indicated by another SSP or another network component.

STP Test Unit 104 is shown in FIG. 1 coupled to the SS7 network via SS7 links 124. Test Unit 104 provides the novel capability for automatically controlling, recording, analyzing, and evaluating the STP testing process in accordance with the invention. Exemplary STP Test Unit 104 is an Automated SS7 Test Results Analyzer (ASTRA) system used for the analysis and evaluating of network components to test for interoperability and standards compliance. Although the SS7 link 124 from the STP Test Unit 104 is shown as a connection to the Quad 102, it is understood that that the STP Test Unit has the connectivity and monitoring ability to monitor all or a subset of the SS7 links, nodes, (e.g., SCP 106, SSPs 108,110, STPs 116,118,120,122) and messages transmitted throughout the system during the testing. Monitoring devices or instrumentation may be included as part of each node, SCP 106, SSPs 108,110, STPs 116,118,120,122, and SS7 links 124 or may be attached externally to each item as required but may be considered part of test unit 104. The high cost and limited availability of monitoring equipment may prevent the comprehensive monitoring of all points in a test network. Various measurements may rely on network system components to provide signal and/or measurement timing information used to record the time of a detected event. As a result, measurements taken at the same time may actually have different times associated with them depending on which network component clock provided the time information associated with the signal measurement, e.g., detected event.

Figure 2:
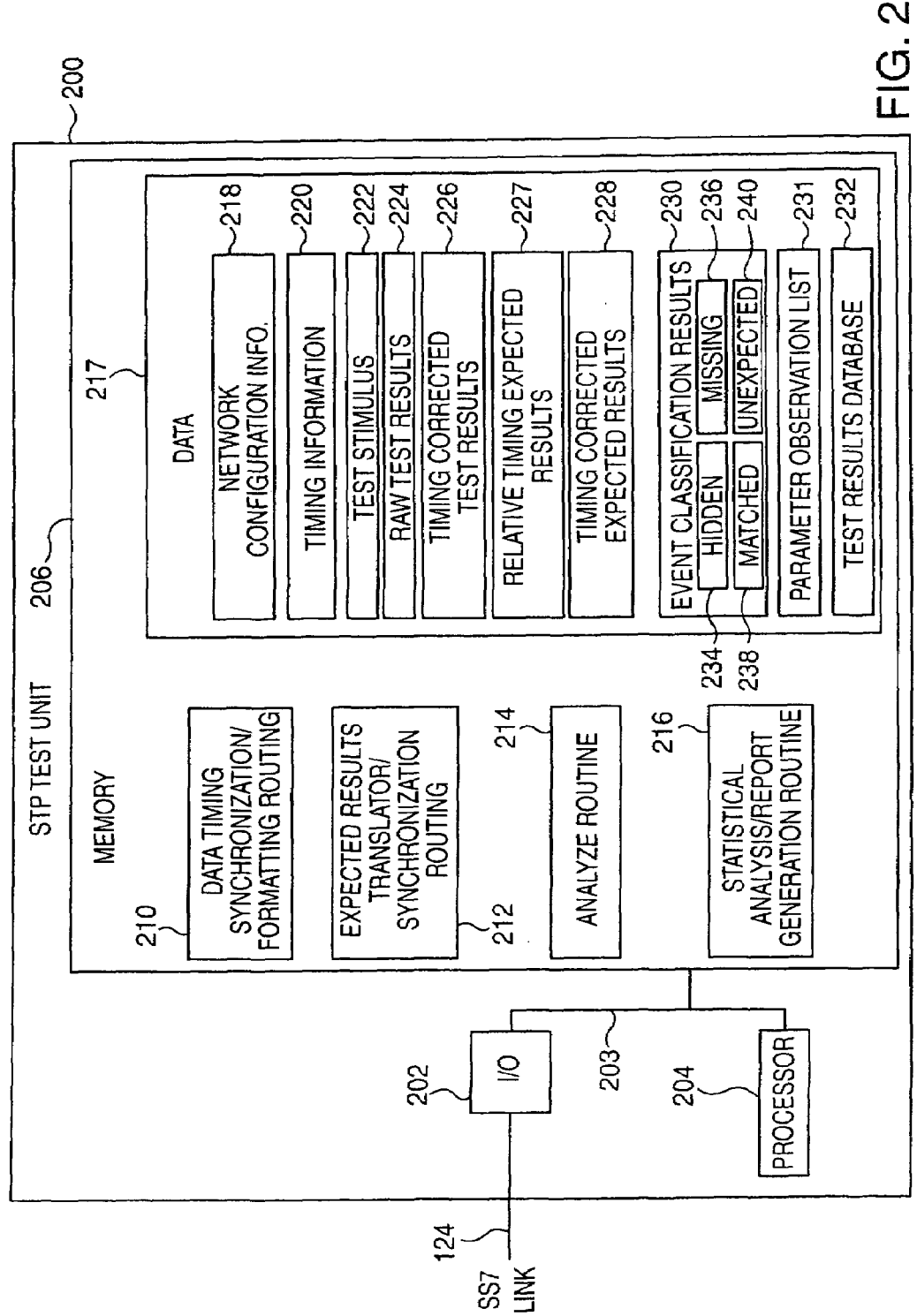
FIG. 2 illustrates a test unit for performing automated testing of network components in accordance with the invention.

FIG. 2 illustrates an exemplary STP Test Unit 200, which may be used as the STP Test Unit 104 of FIG. 1. The STP Test Unit 200 includes a processor 204, an Input/Output Interface 202, and memory 206. The memory 206 includes a Data Timing Synchronization/Formatting Routine 210, Expected Results Translator/Synchronization Routine 212, an Analyzer Routine 214, a Statistical Analysis/Report Generation Routine 216, and Data 217.

The I/O Interface 202, the processor 204, and the memory 206 are coupled together via bus 203 and can exchange data and information. The processor 204 executes routines 210, 212, 214, 216, uses, processes, and stores data 217, and interfaces to the SS7 links 124 via I/O interface 202 in accordance with the of the present invention. The I/O interface 202 also provides a user interface for entry, display, input, output of test data, results, and summaries.

Data 217 includes Network Configuration Information 218, Timing Information 220, Test Stimulus 222, Raw Test Results 224, Timing Corrected Test Results 226, Relative Timing Expected Results 227, Timing Corrected Expected Results 228, Event Classification Results 230, a Parameter Observation List 231 and a Test Results Database 232.

Network Configuration Information 218 includes information describing the network configuration used during the testing including and a list of nodes and links monitored. Examples of network configuration information 218 include manufacturer, type, model, software release version of each STP 116, 118, 120, 122, for each SSP 108, 110, and SCP 106, and a definition of type and length of SS7 links 124 throughout the SS7 network. Network Configuration Information 218 also includes a list of monitoring points for which data was not collected.

Timing Information 220 includes a record of when each step was performed in the test sequence. Timing information 220 may also include error offsets and clock adjustments for individual network components, e.g., STPs. Timing information 220 can be used to correct for timing differences associated with test results that have time stamps from different clocks thereby allowing for test results to be accurately compared in terms of event times despite clock differences.

Test Stimulus 222 includes the stimuli that is applied to the system 100 under test. The Test Stimulus 222 is chosen with the intention of exercising the system's functionality, and is generally specified in a test plan developed for the protocol testing. Test Stimulus 222 may include specific inputs, setting, changes, or adjustments at STPs 116,118, 120,122. One example, of test stimulus 222 is an input to STP A 116 which causes the direct SS7 link 124 from STPA 116 to STP B 118 to be lost or otherwise dropped.

Raw Test Results 224 includes the input data collected during the test, such as the SS7 signaling messages recorded during the test which had been flowing between mated STP pair 112 and STP mated pair 114. Raw Tests Results data 224 may be input to the STP Test Unit 200 over the SS7 link and I/O interfaces 202 during the test or may be collected remotely, stored, and entered into the STP Test Unit 200 when analysis is required.

The Data Timing Synchronization/Formatting Routine 210 processes the Network Configuration Information 218, the Timing Information 220, and the Raw Test Results 224 in order to generate the Timing Corrected Test Results 22. The timing Corrected test Results 226 is a file consisting of actual event records (AERs) from the test for each event. Data formatting performed in routine 210 is fairly mundane, but nonetheless necessary; The data formatting ensures the consistency of data from all monitors, adjusting for variations in format from different monitor types, and variations in synchronizations of different monitors. Routine 210 integrates the records with multiple monitors to form a single actual event record (AER), and filters the AER to remove irrelevant information that may be introduced by STPs 116, 118, 120, 122 that are configured with information (point codes) about nodes that were not configured in the test (to avoid time consuming precise configuration). Rountine 210 also abstracts the numerical form of identifiers used by the monitoring equipment (e.g. point code 246-022-022) into the human friendly symbolic form used in an Expected Behavior (EB), so that the EM and AER are compatible. Finally, it sorts the events in the AER into chronological order, so as to expedite searching during event matching, and adds to each event a 'matched' field that is used by the matching process. The output of this processed AER from routine 210 is the Timing Corrected Test Results 226. with the following rewritten paragraph:

The Relative Timing Expected Results 227 is a numbered list of events that are expected during the test, with each event indication are included the number of any other events that it causes along with the time or time period in which each event should occur relative to a preceding event or test stimulus.

The Expected Results Translator/Synchronization Routine 212 utilizes Network Configuration Information 218 and Timing Information 220 to transform the Relative Timing Expected Results 227 into a unique test specific file, the Timing Corrected Expected Results File 228, providing a description of the expected behavior during the test including actual expected event times. Thus, the timing corrected expected results file 228 includes actual fixed times as opposed to relative times which are generated using test start time information.

The Analyzer Routine 214 performs event matching by classifying events in the Timing Corrected Expected Results 228 and the Timing Corrected Expected Results 228 and the Timing Corrected Test Results 226. The results of the classification are stored in the Event Classification Results 230. The Event Classification Results data 230 consists of 4 categories: Hidden Event List 234, Missing Event List 236, Matched Event Record 238, or Unexpected Event List 240. The Analyzer Routine 214 also generates a Parameter Observation List 231. The Parameter Observation list 231 includes information that indicates how long the STP did wait before causing a subsequent event.

Figure 4:
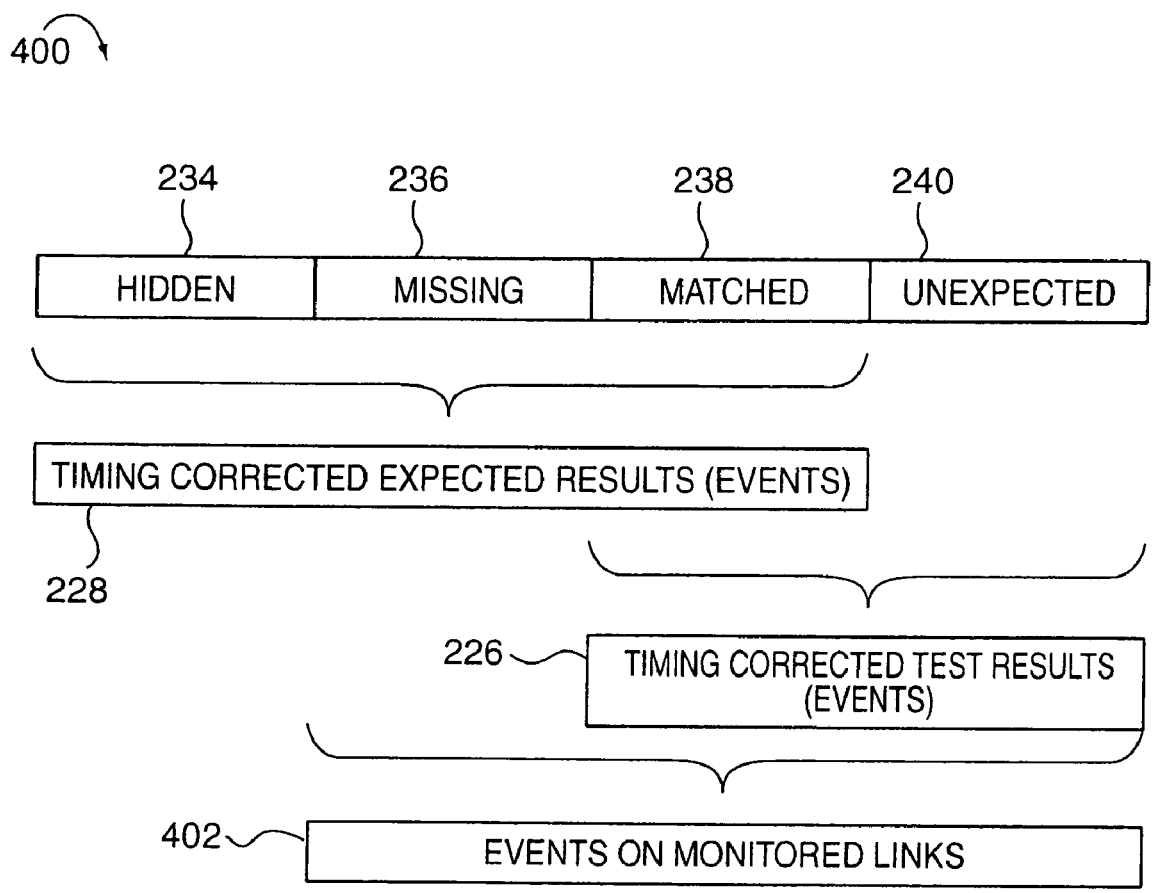
FIG. 4 illustrates the relationship between various types of test results which are produced as part of the automated testing process of the present invention.

FIG. 4 illustrates the relationship between the four Event Classification Results 230: Hidden 234, Missing 236, Matched 238, and Unexpected 240. FIG. 4 shows how these event classifications relate to which events were expected, which actually occurred, and which were observable given the monitors of the test. Events within the list of events of the Timing Corrected Expected Results 228 include: Hidden 234, Missing 236 or Matched 238. Events within the Timing Corrected Test Results 226 include: Matched 238 or Unexpected 240. Events on Monitored links 402 includes: Missing 236, Matched 238, or Unexpected 240.

The first stage of the event matching within the analyzer routine 214 is driven by the Expected Behavior. The analyzer routine 214 checks if each event in the Timing Corrected Expected Results 228 was expected on a link that was monitored during the test. If not, then the event is classified as Hidden 234. If the link was monitored, then the analyzer routine 214 searches the Timing Corrected Test Results 226 for the event. Events that can't be found in the Timing Corrected Expected Results 226 are classified as Missing 236, while others are classified as Matched 238. If the Matched Even causes other events, then the analyzer routine 214 also searches for those events from the time of the first matched event.

The second stage of the event matching of the analyzer routine 214 is driven by the Timing Corrected Test Results 226, or more precisely the Matched Event Record (MER) 238, which indicates which events in the Timing Corrected Test Results 226 were matched to the Timing Expected Test Results 228 and which events were not. The second stage takes each event in the MER 238 that was not matched to an event in the Timing Corrected Test Results 226, and classifies it as unexpected, writing it to the Unexpected Event List 240.

The Statistical Analysis/Report Generation Route 216 collects and summarizes the Hidden Events 234, the Missing Events 236, the Matched Events 238, the Unexpected Events 240, and the Parameter Observation List 231 in order to create a Test Results Database 232. In accordance with the invention, the Routine 216 statistically analyzes events recorded in the Timing Corrected Test Results 226 which had been classified in the Events Classification results 230, in order to infer STP parameters, and presents these and information about the test events in a report that describes how the STPs 116,118,120,122 faired during the test.

An example of a Test Report and interpretive summary based upon the Test Results Database 232 follows. A series of interoperability tests between STPs from two manufacturers detected three bugs with the STPs from one manufacturer that could interfere with interoperability. These bugs appeared in a link failure test. According to the SS7 protocol, an STP should respond to a link failure or restoral by sending a message to neighboring STPs indicating that traffic flow through it is either restricted (because it had poor connectivity to the destination), prohibited (because it had no connectivity to the destination), or allowed (because a link has become available, enabling connectivity to the destination). In the exemplary tests, in accordance with the invention, the STPs from one vendor sometimes responded to link failure by indicating that the traffic was allowed to flow, rather than indicating that it was restricted or prohibited. These STPs also sometimes sent restriction messages, when they were expected to send prohibition messages, allowing a routing loop to occur. Finally, these STPs were sometimes unnecessarily conservative in that they indicated to their mated pairs that traffic was prohibited when it should only have been restricted. ASTRA readily allowed the human analyst to pinpoint this unexpected behavior amidst numerous events that occur during the testing.

Figure 3:
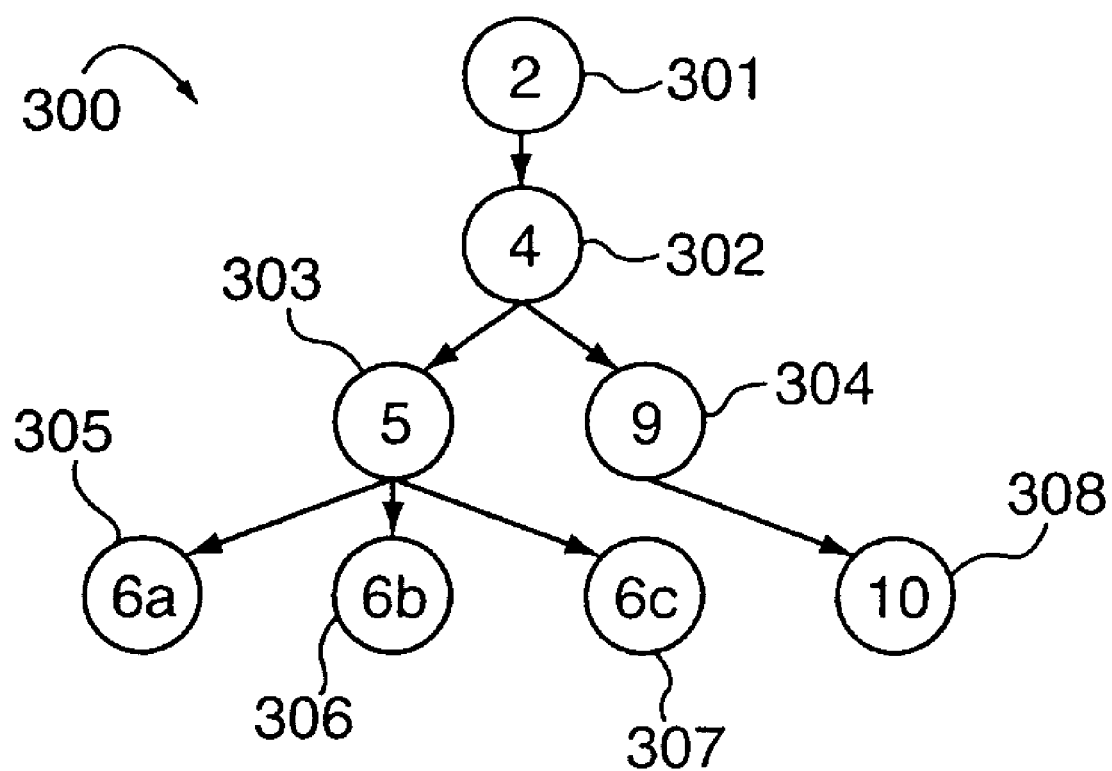
FIG. 3 illustrates an event list including a chain of expected events.

FIG. 3 illustrates a key feature of the Relative Timing Expected Results 227; one event can cause multiple succeeding events, and the relative order of these succeeding events is not always predictable. For example, referring to FIG. 1 the failure of the SS7 link directly connecting SSP 1 108 to STP A 116 should cause STP A 116 to send Transfer Restricted (TFR) messages to neighboring SSP 2 110 and to the SCP 106, indicating that it no longer provides a direct path to the SSP1 108 whose link failed. The SS7 protocol for which compliance testing is performed does not specify the order in which STP A 116 must send these two TFR messages. For testing in accordance with the invention, each expected event is triggered by a single predecessor; there is no situation in which an event depends on multiple independent predecessors. Therefore, the Relative Timing Expected Results 227 can be expressed as a tree 300 as shown in FIG. 3. In accordance with the invention, the Relative Timing Expected Results 227 for a test may be a numbered list of events that are expected during the test. Associated with each event number is an entry indicating the numbers of any other event(s) that the numbered event causes. FIG. 3 provides an abstract example of the tree structure of the Relative Timing Expected Results 227 showing which events cause other events. In the abstract example of FIG. 3: Event 2 301 causes Event 4 302; Event 4 302 causes Event 5 303 and Event 9 304; Event 5 causes Events 6a 305, 6b 306, and 6c 307; Event 9 causes Event 10 308.

In order to create a Relative Timing Expected Results file 227, an Expected Behavior Expression Language (EBEL) is used in accordance with the invention to capture how we expect the STPs 116,118,120,122 to behave during a test. The heart of the EB for a test is a numbered list of events that are expected during the test, with each event listing the number of any other events which it causes. The EB can be expressed as the tree structure of the example FIG. 3 as described above. In the FIG. 3 example, the numbers correspond to the line numbers of a particular EB as shown in exemplary extract shown below and letter designations a,b,c of event 6a 305, event 6b 306, event 6c 307, respectively, indicate different iterations of a loop. To describe the EB, text files were created that described one event on each line, with lines describing events that caused other events containing the phrase "causes" followed by a list of the line number(s) of the event(s) that the event on this line causes. To manage the numbering and references, in accordance with the invention, the EB was created using Microsoft Word, using its line-numbering, cross-references and update features, and saved these as text files for automated processing. Relative timing information may be associated with individual events as part of the EB for a test. Thus, in addition to causation, the EB may indicate the time at which the resulting event is to occur following the causal event. This timing information may be expressed as a time range, e.g., within 40 ms or within 40–100 ms of the causal event or stimulas.

The EB lists stimuli 222 to the system under test, and the expected responses to the system under test including timing information.

The chain of events that stimulate the system under test during the tests define the Test Plan, and the Generic Commands and control structures used to represent these events can be used in both the EB, and also in a Test Action List that drives automated test execution.

Exemplary Generic Commands are:

fail_link( ), restore-link( ): fail or restore a specific link in the network configuration, set_load ( ):

set the load on a particular link to a particular level, and pause ( ): wait a certain period (e.g., to allow network traffic to stabilize) before injecting the next stimulus.

In testing, in accordance with the invention, it was possible to express the Test Action List in an open-loop manner so that the test actions, and their timing, did not depend on the behavior of the system under test. In the EB, each line containing a test action also contains a symbolic label (e.g. $ta_fail {$s}, indicating that the value of the variable $s should be appended to the string $ta_fail, to create a label for the test action on this line) that other parts of the EB (e.g. while loops) can use to refer to the time of the test action. The matching process uses these to define the scope of the search for an event. The EB uses the symbolic names for these times, since it is produced before the test is performed. After the test, during analysis, these symbols are instantiated with actual times when each test action was performed by the Expected Results Translator/Synchronization Routine 212.

The messages that an STP transmits on the links are the most common measure of the response of an STP, and the EB may be concerned with the type and parameters of a specific message, or with the aggregate volume of messages flowing over a particular path. The EM includes findmsg ( ) commands to find a message with particular properties (e.g., type and originating and destination point codes) passing over a certain link or an arbitrary link, and assert_load ( ) commands to check whether the load on a link is within a specified tolerance on of a certain level. The STP's log of events that it observes is another important response, since accurate logs help alert network operators of imminent problems, and help problem diagnostics.

The parameters to findmsg( ) can be expressed as wildcards (*), indicating that the matching process should ignore that parameter (e.g., a link, node or message type identifier) when trying to find a matching message. Wildcards are convenient in the EB to determine if an STP sends a particular message to any other node (wildcards for link and destination), or whether an STP sends any type of message to a particular node.

The EB also includes control structures that allow iteration of the stimuli and responses, e.g., a foreach loop can be used with a fail_link( ) command, to fail each link connecting an STP to adjoining SSPs, and a while loop can be used with a findmsg( ) command, to indicate that an STP is expected to continue sending a certain type of message until a certain time.

A waitfor( ) command allows the EB to describe situations in which the SUT is expected to wait for a certain period of time before making some response. The first waitfor( ) argument provides the symbolic name of the parameter that specifies the period that the STP should wait for, and the second indicates which STP's parameter to use. Part of the matching stage of the Analyzer Routine 214 involves recording the observed values of these parameters, so that the report generation stage of the Statistical Analysis/Report Generation Routine 216 can infer the value of this parameter that the STP is using and compare it to the value that the STP claims to be using.

The waitfor( ) command is used in two different ways: Within while loops, it regulates the speed at which the while loop repeats, and directly causes only one other event, e.g., describing the expectation that an STP will send a certain message regularly while a link is available. Outside of while loops, it is used to indicate a delay between one event and one or more consequent event(s), and so may cause multiple events.

Set forth below is an extract of the EB of an STP, showing how the STPs 116, 118, 120, 122 are expected to respond to the sequential failure of links 124 connecting SSPs 108, 110 to STP A 116. In the example below, @SSP_E is a set of SSP identifiers, and the foreach loop is repeated to fail the link 124 connecting STP_A 116 to each SSP ($s) 108, 110 in this set. The set@set_1 describes the nodes (SSPs 118,120, 122 and SCPs 106) that remain connected to STP_A 116 after the link 124 has been failed; the extract of the code does not show where @set_1 is updated. In this example a period of T11 after STP A 116 detects the link failure, it is expected to send TFR messages to STP D 122 and the remaining neighboring STPs 118, 120. Once STP D 122 receives the TFR message, it should repeatedly (with period T10) send a Signalling Route-Set-Test-Restricted (RSR) message to STP A 116 inquiring if the path has been restored. $time is a global variable that is updated during the matching process to indicate the time of the latest actual event the matching process has attempted to match with an expected event.

```
1.  foreach $s (@SSPS_E) {
2.     $ta_fail{$s}: fail_link(A(STP_A) ($s)) causes 4, . . .            if( 2 ) {
3.  . . .
4.     waitfor(T11,STP_A) causes 5,9,. . .                                if( 4 ) {
5.     foreach $t (@set_1) {                                               /*5*/ foreach $t (
6.        findmsg(A(STP_A) ($t),$t,STP_A,$t,TFR,$s)                            6$t
7.     }                                                                   }
8.  . . .                                                                 }
9.     findmsg(D(STP_A) (STP_D),STP_D,STP_A,STP_D,TFR,$s)causes 10       if( 9 ) {
10.    while($time<$ta_restore{$s}) {                                       10
11.       waitfor(T10,STP_D) causes 12                                    }
12.       findmsg(D(STP_A) (STP_D),STP_A,STP_D,STP_A,RSR,$s)             }
13.    }                                                                 }
```

-continued

```
14. ...
15. foreach $s (@SSPS_E) {
16.   $ta_restore{$s}: restore_link(A(STP_A) ($s)) causes . . .
```

Creating the EB for each test in the Test Plan, and validating the expectations against observed behavior, proved to be a time consuming task. For the twelve tests in the exemplary test plan performed, the EB totaled almost 6,000 lines and described over 30,000 events.

The Expected Results Translator/Synchronization Routine 212 translates the EB file itself into a Perl script: If one event causes a group of other events, then this can be expressed in Perl as the first event being the condition of an if statement, and the consequent events being placed in the event body of the if statement. When an event causes a group of events surrounded by a control structure, e.g. event 4 of the exemplary EB extract above (refer to line 4) causes a foreach loop, then the control structure is included in the body of the if statement that depends on that event. Next to the exemplary EB extract shown above, is an illustration of the nesting of if statements used to represent the abstract event tree of FIG. 3. Each number shown in bold (2,4,5,6, 9,10) can be replaced with the line to the left that has the same number, creating the hierarchy of if statements corresponding to FIG. 3.

The depth of the tree of expected events can lead to many levels of hierarchy in the if statements, producing code that is difficult for humans to read. This is acceptable, in accordance with the invention, because the translated EB is used only by the automated system. The original EB was not originally expressed as a hierarchy of if statements, so that the original EB would be easier for humans to read.

The hierarchy of if statements leads to a program that performs a depth-first search of the tree of expected events. The search for an event covers all actual events that occur between the times of the antecedent event (stored in a variable $time) and the time of the next test action (stored in another variable $next_action_time). Events that are enclosed in a while loop form an exception to the general rule; their search continues until the time specified as a parameter to the while loop, not until the time of the next action.

Astra includes a translator. The translator is implemented as part of the Expected Results Translator/Synchronization Routine 212, written in Perl, that translates the EB into an Analyzer which becomes part of the Analyzer Routine 214. Translation is similar to the compilation of a program written in a high level language such as C: It takes as input to a program that is in a human-readable form, and produces a program that can be executed. In the case of ASTRA, the Analyzer that results from the tranlation is a Perl program. The translation also link the Analyzer Routine 214 to libraries of functions that are used during the matching process and the formatting results.

The Translator 212 is run after a test is run so that the Analyzer Routine 214 can include information that is specific to the test run. This information includes network configuration information 218 (which affects the definitions of set of nodes used in the EB), the list of links 124 that were monitored during the test (which determines which events will be classified as being "hidden" 234), and the times of test actions included in timing information 220 (which affect the searching operation).

A secondary function, in accordance with the invention, of the Translator of the Expected Results Translator/Synchronization Routine 212 is to help people create EB files, referred to as the RelativeTiming Expected Results 227, by checking the syntax of the EB files, and converting identifiers in the EB into the form required by Perl: enclosing names of links and nodes in quotes (e.g. STP_B? "STP_B") and prefaceing function calls with ampersands and suffixing them with semicolons (e.g. findmsg( . . . ) &findmsg( . . . );).

The event matching as part of the Analyzer Routine 214 has been briefly described above. There are three important additional details about the operation of the first stage of the event matching with regard to ASTRA. These relate to the search depth, the recording of the parameter observations 231, and the matching of events that use wildcards, and are discussed in the following paragraphs.

Search depth: When ASTRA fails to match an event, it prunes the tree of expected events at that event; e.g., it does not search for consequent events that the missing event was expected to cause. If the consequent events are also missing, then they will not appear in the Missing Events List 236, since the omission of their antecedent implies that they will be missing. This reduces the list of missing events 236 so that a human analyst can concentrate on the root events that were missing, and need not be inundated with mass of consequent events that may be missing. If the consequent events were not missing, e.g., if monitoring equipment simply failed to detect the antecedent event, then they will appear in the AER of the Timing Corrected Test Results 226, and ASTRA will mark these as unexpected 240.

Parameter Observation: When ASTRA matches an event that is caused by a waitfor( ) statement, it records an observation of the delay between the event that caused the waitfor( ) statement and the event that the waitfor( ) statement caused. This observation measures an instance of the parameter of the waitfor( ) statement that indicates how long the STP should wait before causing the next event, and is recorded in the paramter observation list 231. The report generation stage of the Statistical Analysis/Report Generation Routine 216, provides a statistical analysis of these parameter observations, allowing an analyst to infer the STP parameter values. The details of the parameter observations depend on whether or not the waitfor( ) statement was included within a while loop.

Observations that indicate missing events: ASTRA only marks an event that was caused by a waitfor( ) statement in a while loop as being missing if it was never found. Other missing events are detected by the distribution of the parameter observations. For example if an STP was expected to send a message every T10 seconds, but every second message the STP tried to send was lost, then ASTRA would indicate that the message was found, but that the timer parameter was observed to be 2×T10 seconds.

Figure 5:
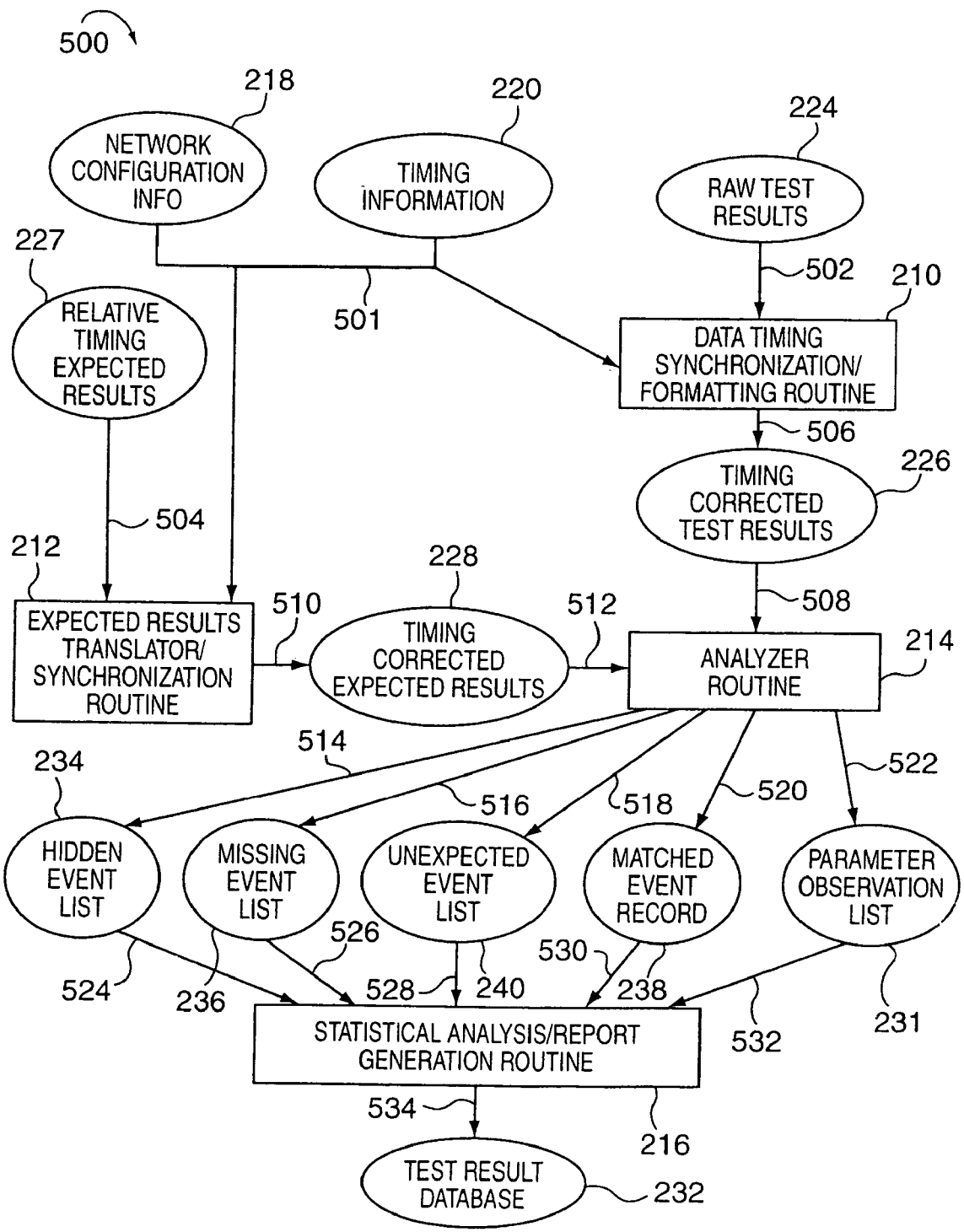
FIG. 5 is a flow chart illustrating processing performed in accordance with the automated testing method of the present invention.

FIG. 5 illustrates the architecture of the method of the automated analysis in accordance with the present invention. In step 501, the Network Configuration Information 218 and the Timing Information 220 are input to both the Data Timing Synchronization/Formatting Routine 210 and the Expected Results Translator/Synchronization Routine 212.

In step 502, the Raw Test Results 224 are input to the Data Timing Synchronization/Formatting Routine 210. In step 504, the Relative Timing Expected Results 227 are input to the Expected Results Translator/Synchronization Routine 212.

In step 510, the Expected Results Translator/Synchronization Routine 212, outputs the Timing Corrected Expected Results data file 228. The timing corrected expected results file 228 is generated by applying stimulus time information to the relative event, e.g., result, timing information included in the expected results 227. In step 512, the Timing Corrected Expected Results data file 228 is input to the Analyzer Routine 214.

In step 506, the Data Timing Synchronization/Formatting Routine 210 outputs the Timing Corrected Test Result 226, which is a time aligned file of the actual event records. This file 226 is generated by using the timing information, e.g., network clock error information, to correct for timing errors corresponding to different network clocks used to make various test result measurements. This correction produces test result times which are synchronized and time aligned sot that timing between events can be compared accurately despite the use of different clocks to make time measurements. Proceeding to step 508, the Timing Corrected Test Results 226 are input to the Analyzer Routine 214.

Analyzer routine 214 compares the timing corrected expected results 228 to the timing corrected test results to identify and classify the different types of results or the omission of expected results from the test results 226. In steps 514, 516, 518, 520, 522 the Analyzer Routine 214 outputs Hidden Events lists 234, Missing Events Lists 236, Unexpected Events lists 240, Matched Events Record 238, and the Parameter Observation List 231, respectively. In steps 524, 526, 528, 530, and 532, the data 234, 236, 240, 238, and 231 is input into the Statistical Analysis/Report Generation Routine 216. In step 534, the Test Results Database 232 is generated as output from the Routine 216. The database 232 is in the form of a test report.

In one embodiment of the present invention each phase of the testing: setting up the test environment, executing the tests, retrieving data collected during the tests, and analyzing the data are automated. In other embodiments of the present invention, parts of the testing are automated and parts are conducted manually.

In other various embodiments of the present invention, the underlying mechanism or method, in accordance with the present invention, e.g., the language for expressing the expected results or expected behavior (EB), the process of translating the EB into a Perl script, and the event matching process, could be applied more generally to the analysis of tests of other protocols and other devices utilizing those protocols.

The above described testing methods and apparatus may be implemented using one or more software routines or modules executed by a CPU, e.g., in the test unit 104, to perform the various data processing and report generation steps discussed above. Accordingly, various aspects of the invention are directed to machine readable instructions and media storing said instructions used to control a process to implement one or more of the processing steps described in the context of the automated testing method. Both the CPU and memory storing the various files described herein may be part of a general purpose computer used to implement test unit 104.

While described in the context of a telephone system, where STPs implemented using telephone switches serve as routing tdevices, the testing methods and apparatus of the present invention can be used in a wide range of communications systems including Internet Protocol (IP) packet based systems. In such systems, IP packet routers are used in place of STPs and rather than checking for SS7 compliance, the testing would involve, e.g., testing for IP compliance and/or compliance with other communications standards used to route packets. The invention is also applicable to ATM and other types of communications networks as well.

Given the high degree of automation, the methods and apparatus of the present invention allow for the testing of multiple test points, at or near different routing devices, thereby allowing tests to determine if signals received at one router result in proper and timely signals at downstream routers. Similarly, the handling of error conditions, link failures, and the signals resulting from such conditions can be checked at a variety of locations, e.g., at the point of simulated or induced failure and also several routers or STPs away from the failed link, over a period of time in which the chain of resulting messages and signals can be monitored and compared to an expected chain of events.

The invention claimed is:

1. An automated testing method for use in a communications network with a plurality of different clocks, the method comprising:

storing clock error information for said plurality of different clocks;

monitoring a plurality of network points to detect events;

generating a set of test results including detected events and corresponding event times, at least some of said event times having been obtained from timing information corresponding to different clocks;

processing said set of test results to generate set of timing corrected test results, said processing including modifying at least some event times as a function of said stored clock error information;

comparing events and corresponding event times included in the set of timing corrected test results to expected events and corresponding expected event times included in a set of expected test results; and generating a set of test result information including information indicating differences between the set of timing corrected test results and expected test results.

2. The method of claim 1, further comprising:

storing a set of relative timing test results, said set of relative timing test results including expected events and relative event times corresponding to the expected events, said relative times being expressed relative to at least one of a test stimulus time and a preceding expected event time; and processing said set of relative timing test results using stimulus time information to produce said set of expected test results, said expected event times being generated as a function of said stimulus time information and said relative times.

3. The method of claim 2, wherein said step of generating a set of test result information includes identifying, as a function of said comparing, detected unexpected events and undetected expected events.

4. The method of claim 3, wherein detected events included in said set of timing corrected test results are identified as detected unexpected events if the detected event and the timing associated with the detected event do not match an expected event and the timing associated with said expected event.

5. The method of claim 3, wherein undetected expected events are events included in said set of expected test results which are not detected in the set of time corrected test results at the expected time.

6. The method of claim 5, wherein said step of generating a set of test result information includes identifying, as a function of said comparing:
expected undetected events which include events in the expected test results which are not found in said set of time corrected test results.

7. The method of claim 6, where said set of expect test result includes lists of expected events arranged based on causal dependency; and
wherein said step of generating a set of test result information includes listing at most one undetected expected event corresponding to each list of expected events arranged based on causal dependency included in said set of expected test results.

8. The method of claim 1, wherein said stored clock error information includes information relating to clocks included in different routing devices, wherein said set of test results includes detected events corresponding to different network links and wherein time information associated with detected events corresponding to different network links is obtained from clocks included in different routing devices.

9. The method of claim 8, wherein said monitored network points correspond to different points in a system including at least four active network routing devices; at least two monitored network points corresponding to the output of two different network routing devices.

10. The method of claim 9, wherein said four active network routing devices are signal transfer points.

11. The method of claim 9, wherein said four active network routing devices are IP packet routers.

12. A testing apparatus for performing communications system testing, said communications system including a plurality of routing devices having different time clocks, the apparatus comprising:
timing information corresponding to at least some of said clocks indicating timing differences between said at least some clocks;
relative timing expected test results including expected events and relative expected event times, each of said relative expected event times being expressed relative to a test stimulus or another expected event time;
an expected results translator module for translating the relative timing information included in said relative timing expected results to actual times as a function of at least one test stimulus time, said expected results translator module producing timing corrected expected results;
raw test results retrieved from monitoring points in said communications system, said raw test results including detected events and detected event times obtained from different clocks;
a timing correction module for processing said raw test results as a function of said timing information to generate a set of detected timing corrected results; and
an analysis module for processing said timing corrected expected results and said detected timing corrected results to generate a set of test results including information identifying undetected expected results and detected unexpected results, said undetected expected results and said detected unexpected results being determined as a function of a comparison between said timing corrected expected results and said detected timing corrected results.

13. The apparatus of claim 12, further comprising:
a report generation module for classifying detected timing corrected events as a function of the comparison between said detected unexpected results and said timing corrected expected results, said classifying including classifying events as detected unexpected events when said detected timing corrected events do not match an expected event.

14. The apparatus of claim 13, wherein said timing information includes clock error information for a plurality of different clocks included in said communications system.

15. The apparatus of claim 14, further comprising:
means for detecting events at a plurality of different test points in said communications system, said test points including a point at which said stimulus can be monitored and a point separated from said stimulus point by at least one routing device.

16. The apparatus of claim 15, wherein the communication system is a telephone communication system including at least four signal transfer points, said plurality of different test points including inputs and outputs of at least three different signal transfer points.

17. The apparatus of claim 15, wherein the communications system is an IP packet routing system and wherein said plurality of different test points includes inputs and outputs of at least three different routers.

18. The apparatus of claim 15, further comprising:
stored test stimulus information; and
means for introducing test stimulus including multiple link failures into said communications system according to said stored test stimulus information.

19. An automated test system for testing communications networks including a plurality of nodes, each of said nodes including a different clock, the test system including:
network node clock information including information suitable for synchronizing time values received from said multiple clocks;
a set of detected events and detected event times;
means for correcting said detected event times as a function of network node clock information to synchronize the time values obtained from different network node clocks; and
means for comparing the detected events and corresponding corrected event times to expected events and corresponding expected event times to identify unexpected detected events.

20. The system of claim 19 wherein said means for comparing further identifies undetected expected events.

21. The system of claim 20, wherein said detected events include events corresponding to a link failure, said test system further comprising:
means for monitoring the failed link and a communications link separated from the failed link by at least two network nodes including routing functionality.

* * * * *

UNITED STATES PATENT AND TRADEMARK OFFICE
CERTIFICATE OF CORRECTION

PATENT NO. : 7,012,992 B2
APPLICATION NO. : 10/628080
DATED : March 14, 2006
INVENTOR(S) : Malathi Veeraraghavan and Tim Moors It is certified that error appears in the above-identified patent and that said Letters Patent is hereby corrected as shown below:

On the title page, item [75], add --; Tim Moors, Bexley (AU)--.

Signed and Sealed this

Twenty-third Day of December, 2008

JON W. DUDAS
*Director of the United States Patent and Trademark Office*